(12) United States Patent
Nakamura et al.

(10) Patent No.: US 10,377,439 B2
(45) Date of Patent: Aug. 13, 2019

(54) MOTORCYCLE

(71) Applicant: HONDA MOTOR CO., LTD., Tokyo (JP)

(72) Inventors: Hironori Nakamura, Wako (JP); Kyosuke Inada, Wako (JP); Tatsuya Seiji, Wako (JP); Shohei Miura, Wako (JP); Masato Niki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/052,827

(22) Filed: Aug. 2, 2018

(65) Prior Publication Data
US 2018/0339745 A1    Nov. 29, 2018

Related U.S. Application Data

(63) Continuation of application No. PCT/JP2017/004171, filed on Feb. 6, 2017.

(30) Foreign Application Priority Data

Mar. 9, 2016  (JP) .................................. 2016-045232

(51) Int. Cl.
*B62K 19/40* (2006.01)
*B62J 23/00* (2006.01)
(Continued)

(52) U.S. Cl.
CPC ............ *B62K 19/40* (2013.01); *B60T 8/3685* (2013.01); *B62J 23/00* (2013.01); *B62J 99/00* (2013.01); *B62K 11/02* (2013.01); *B62K 19/32* (2013.01); *G01P 1/023* (2013.01); *G01P 15/0802* (2013.01); *B62J 1/12* (2013.01);
(Continued)

(58) Field of Classification Search
CPC ....................... B62J 2099/002; B62K 2207/00
See application file for complete search history.

(56) References Cited

U.S. PATENT DOCUMENTS

| 9,802,589 B2 * | 10/2017 | Kitagawa | ............... G01D 11/30 |
| 10,112,673 B2 * | 10/2018 | Kitagawa | ................... B62J 1/08 |
| 2018/0043872 A1 | 2/2018 | Kitagawa | |

FOREIGN PATENT DOCUMENTS

| JP | 2004-093537 A | 3/2004 |
| JP | 2006-056307 A | 3/2006 |

(Continued)

OTHER PUBLICATIONS

Search Report dated May 9, 2017, in International Application No. PCT/JP2017/004171.

(Continued)

*Primary Examiner* — Kevin Hurley
(74) *Attorney, Agent, or Firm* — Thomas | Horstemeyer, LLP

(57) ABSTRACT

A motorcycle includes a main frame, a seat frame connected to a rear portion of the main frame and extending backward to support a seat, an auxiliary frame reinforcing the seat frame, and an acceleration sensor. The acceleration sensor is supported at a position under the seat frame and above the auxiliary frame in a side view by a bracket extending from the seat frame or the auxiliary frame. Side surfaces of the acceleration sensor are covered with a vehicle body cover.

5 Claims, 5 Drawing Sheets

(51) Int. Cl.
   *B62J 99/00*    (2009.01)
   *B62K 19/32*    (2006.01)
   *G01P 15/08*    (2006.01)
   *B62K 11/02*    (2006.01)
   *G01P 1/02*     (2006.01)
   *B60T 8/36*     (2006.01)
   *B62J 1/12*     (2006.01)
   *G01P 15/18*    (2013.01)

(52) U.S. Cl.
   CPC ..... *B62J 2099/002* (2013.01); *B62K 2207/00* (2013.01); *G01P 15/08* (2013.01); *G01P 15/18* (2013.01)

(56) References Cited

FOREIGN PATENT DOCUMENTS

| | | | | |
|---|---|---|---|---|
| JP | 2007-055422 A | | 3/2007 | |
| JP | 2011-020603 A | | 2/2011 | |
| JP | 2012-051443 A | | 3/2012 | |
| JP | 2012051443 A | * | 3/2012 | ............... B62H 5/00 |
| JP | 2013-136356 A | | 7/2013 | |
| JP | 2014-069696 A | | 4/2014 | |
| JP | 2014201173 A | * | 10/2014 | |
| JP | 2015-123940 A | | 7/2015 | |
| JP | 2017-013731 A | | 1/2017 | |
| WO | 2017/154437 A1 | | 9/2017 | |

OTHER PUBLICATIONS

Japanese Office Action in related, co-pending JP Application No. 2018-504057, dated May 31, 2019 (with English Translation).
"Serial Sensor Package (SSP)," United States, Jan. 2016.

\* cited by examiner

MOTORCYCLE

This application is a continuation of International Patent Application No. PCT/JP2017/004171 filed on Feb. 6, 2017, and claims priority to Japanese Patent Application No. 2016-045232 filed on Mar. 9, 2016, the entire content of both of which is incorporated herein by reference.

TECHNICAL FIELD

The present invention relates to a motorcycle including an acceleration sensor.

BACKGROUND ART

Detecting an acceleration applied to a vehicle to grasp the behavior of the vehicle is known. In recent years, mounting an acceleration sensor on a motorcycle has been proposed (for example, FIG. 1 of Japanese Patent Laid-Open No. 2015-123940).

As shown in FIG. 1(a) of Japanese Patent Laid-Open No. 2015-123940, in a saddle ride type vehicle (1) (the number in parentheses is a reference numeral in Japanese Patent Laid-Open No. 2015-123940, and the same applies hereinafter), a pivot support portion (12) is provided on the rear side of a frame (11). A swing arm (14) is attached to the pivot support portion (12) through a pivot member (13). A rear wheel (R) is attached to the rear side of the swing arm (14).

As shown in FIG. 1(c) of Japanese Patent Laid-Open No. 2015-123940, an acceleration sensor (20) is provided at the center of the pivot member (13) in the vehicle width direction. The attachment portion of the acceleration sensor (20) is limited because it is attached to the pivot member (13). Additionally, in the technique of Japanese Patent Laid-Open No. 2015-123940, a cover for protecting the acceleration sensor (20) is needed as a separate member, and the number of parts increases.

Hence, to omit the protective cover, the acceleration sensor is preferably arranged inside a vehicle body cover. In the motorcycle, however, since various parts are densely arranged, it is difficult to easily arrange the acceleration sensor inside the vehicle body cover. So, it is necessary to arrange the acceleration sensor inside the cover while reducing an influence on the arrangement of other parts.

SUMMARY OF INVENTION

It is an object of the present invention to provide a motorcycle capable of arranging an acceleration sensor inside a cover while reducing an influence on the arrangement of other parts.

According to an aspect of the present invention, there is provided a motorcycle comprising a main frame extending backward from a head pipe, a seat frame connected to a rear portion of the main frame and extending backward to support a seat, an auxiliary frame provided under the main frame and having a rear end connected to the seat frame to reinforce the seat frame, and an acceleration sensor configured to detect an acceleration, wherein the acceleration sensor is supported at a position under the seat frame and above the auxiliary frame in a side view by a bracket extending from the seat frame or the auxiliary frame, and side surfaces of the acceleration sensor are covered with a vehicle body cover.

In the aspect of the present invention, the acceleration sensor is arranged at a position under the seat frame and above the auxiliary frame. The seat frame and the auxiliary frame are arranged on the rear side of the vehicle. Large electrical components such as a battery are arranged under the seat. However, a sufficient space exists between the seat frame and the auxiliary frame. This space makes it possible to arrange the acceleration sensor in the rear region of the vehicle while preventing any influence on the arrangement of electrical components on the rear side of the vehicle. Since the acceleration sensor is arranged inside the vehicle body cover, a fine appearance is maintained. Hence, according to the aspect of the present invention, it is possible to provide a motorcycle capable of arranging an acceleration sensor inside a cover while reducing an influence on the arrangement of other parts.

In an embodiment, the acceleration sensor is elastically suspended from the seat frame. In the embodiment, since the acceleration sensor is elastically suspended from the seat frame, a vibration that the acceleration sensor receives from the vehicle can be reduced.

In an embodiment, the acceleration sensor is arranged in a tilting state. In the embodiment, since the acceleration sensor is arranged in a tilting state, pitching can easily be detected.

In an embodiment, in a side view of the vehicle, the acceleration sensor is arranged near an upper end support portion of a rear cushion. In the embodiment, since the acceleration sensor is arranged near the upper end support portion of the rear cushion, the behavior of the rear wheel can easily be transmitted to the acceleration sensor through the rear cushion, and the behavior of the vehicle can easily be detected.

In an embodiment, the acceleration sensor is arranged at a position where the acceleration sensor at least partially overlaps the seat frame or the auxiliary frame in a plan view. In the embodiment, since the acceleration sensor is located at a position where it overlaps the seat frame, an influence on the layout of members arranged between the seat frames can be reduced.

In an embodiment, the acceleration sensor is stored in a case made of a resin, and is provided with a connecting port of a coupler on a lower surface side. In the embodiment, since the acceleration sensor is covered with a resin case, and the connecting port faces downward, the waterproofness can increased.

DESCRIPTION OF EMBODIMENTS

The embodiment of the present invention will now be described with reference to the accompanying drawings. Note that front/rear, left/right, and up/down represent directions defined with respect to a driver on the seat as a reference. In addition, the drawings are assumed to be seen in the directions of symbols.

Figure 1:
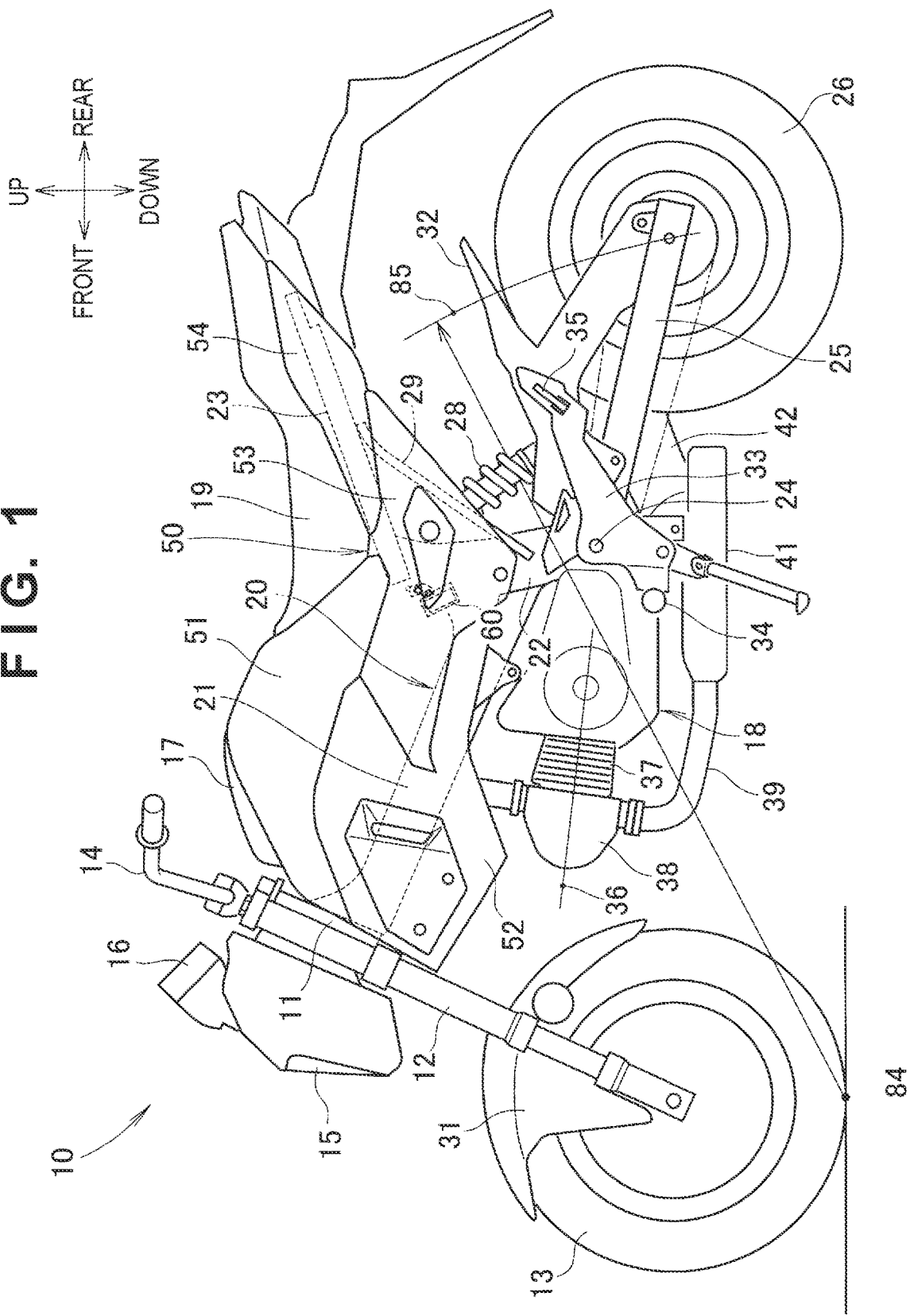
FIG. 1 is a left side view of a motorcycle according to the present invention.

As shown in FIG. 1, a motorcycle 10 is a saddle ride type vehicle in which a front fork 12 is provided on a head pipe 11 to be freely steered, a front wheel 13 is rotatably attached to the lower end of the front fork 12, a steering handle 14 is provided at the upper end of the front fork 12, a headlight 15 and a meter unit 16 are provided in front of the steering handle 14, a main frame 21 as the main part of a vehicle body frame 20 extends from the head pipe 11 to the rear side of the vehicle, a fuel tank 17 is supported by the main frame 21, a pivot frame 22 extends downward from the rear end of the main frame 21, an engine 18 is supported by the main frame 21 and the pivot frame 22, a seat frame 23 that supports a seat 19 extends from the rear portion of the main frame 21 to the rear side of the vehicle, the front end of a swing arm 25 is connected to the lower portion of the pivot frame 22 through a pivot shaft 24, and a rear wheel 26 is rotatably attached to the swing arm 25 extending to the rear side of the vehicle.

A rear cushion 28 is bridged over the swing arm 25 and the rear portion of the main frame 21. The rear cushion 28 is arranged to tilt such that its upper end is located on the front side of the vehicle with respect to its lower end. An auxiliary frame 29 extends obliquely upward from an intermediate position of the height of the pivot frame 22. The rear end of the auxiliary frame 29 is connected to the seat frame 23. That is, the seat frame 23 is reinforced by the auxiliary frame 29 arranged under the seat frame 23.

An acceleration sensor 60 configured to detect an acceleration is arranged at a position under the seat frame 23 and above the auxiliary frame 29. Preferably, the acceleration sensor 60 is arranged near the upper end of the rear cushion 28.

A front fender 31 is arranged near the front wheel 13. A rear fender 32 is arranged near the rear wheel 26. A step bracket 33 is attached to the pivot frame 22. A step 34 on which the driver places a foot is provided on the front side of the step bracket 33. A pillion step 35 on which a pillion passenger places a foot is provided on the rear side of the step bracket 33.

The engine 18 is arranged with a cylinder 37 leaning forward in a form in which a cylinder shaft 36 extends almost horizontally or obliquely upward to the front side of the vehicle. An exhaust pipe 39 extending from a cylinder head 38 passes under the cylinder 37 to the rear side of the vehicle. Exhaust gas is exhausted through a catalyst chamber 41 and a muffler 42.

The main part of the motorcycle 10 is covered with a vehicle body cover 50. The vehicle body cover 50 is formed from, for example, a tank cover 51 that surrounds the fuel tank 17, a front side cover 52 extending from the head pipe 11 to the rear side of the vehicle while extending along the lower edge of the tank cover 51, a middle side cover 53 following the front side cover 52 to extend to the rear side of the vehicle, and a rear side cover 54 following the middle side cover 53 to extend to the rear side of the vehicle and extend along the lower edge of the seat 19. The acceleration sensor 60 is arranged in the middle side cover 53 that constitutes the vehicle body cover 50. That is, the side surfaces of the acceleration sensor 60 are covered with the vehicle body cover 50.

Figure 2:
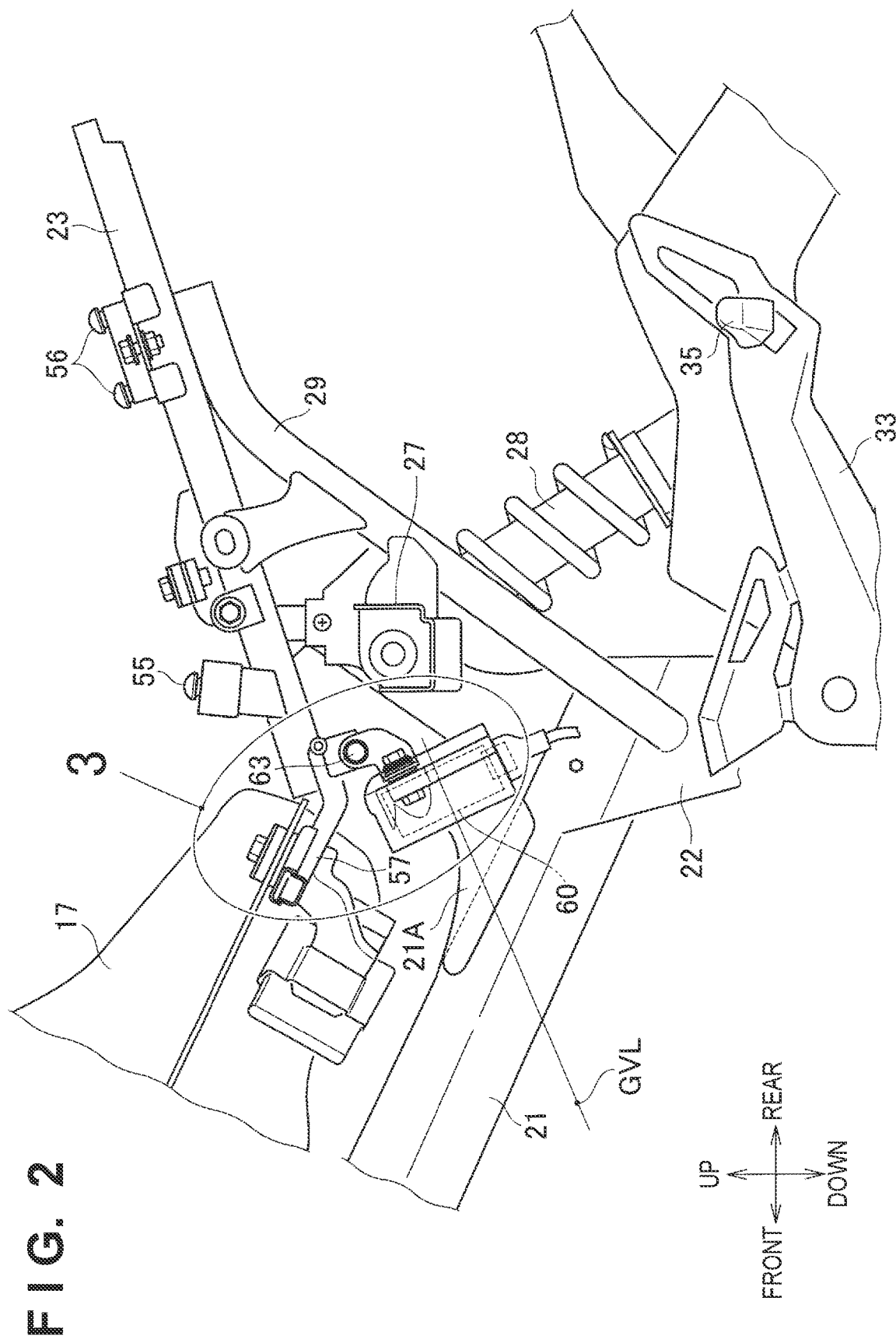
FIG. 2 is an enlarged view of the main part of the motorcycle in a state in which a vehicle body cover is removed.

FIG. 2 is an enlarged view of the main part of the motorcycle in a state in which the vehicle body cover 50 is removed. The vehicle body frame 20 includes at least the main frame 21 extending backward from the head pipe 11, an upward extending bracket 21A extending upward from the rear portion of the main frame 21, the seat frame 23 having a front end joined to the upward extending bracket 21A and extending backward, the pivot frame 22 extending downward from the rear portion of the main frame 21 to swingably support the swing arm 25, and the auxiliary frame 29 extending upward from the upper portion of the pivot frame 22 to the rear side and joined to the rear portion of the seat frame 23.

A key cylinder 27 is provided in the middle of the auxiliary frame 29. The key cylinder 27 is a part to switch lock/unlock of a helmet holder. Seat supports 55 and 56 configured to support the seat (19 in FIG. 1) are provided on the seat frame 23.

A tank stay 57 configured to support the rear portion of the fuel tank 17 extends from the lower portion of the front end of the seat frame 23 to the front side of the vehicle.

The acceleration sensor 60 may directly be attached to the seat frame 23. In this example, however, the acceleration sensor 60 is suspended under the tank stay 57. GVL represents a center line of the acceleration sensor 60 in the vertical direction. In this example, the center line GVL in the vertical direction makes an almost right angle with respect to the shaft of the rear cushion 28.

The acceleration sensor 60 is arranged at a position under the seat frame 23 and above the auxiliary frame 29. There is a sufficient space between the seat frame 23 and the auxiliary frame 29 because no large electrical components are arranged there. That is, it can be said that the acceleration sensor 60 is arranged in a portion where the influence on other electrical components is as small as possible.

In addition, the acceleration sensor 60 is arranged within the width of the seat frames 23 (23L and 23R in FIG. 5) in a plan view. More specifically, the acceleration sensor 60 is arranged at a position where it at least partially overlaps the seat frames 23 and the tank stay 57 in a plan view. Note that in this embodiment, the acceleration sensor 60 is arranged at a position where it overlaps the seat frames 23 and the tank stay 57. The seat frame 23 in this specification includes a bracket (the tank stay 57 here) that is integrated so as to be regarded as the seat frame 23.

Figure 3:
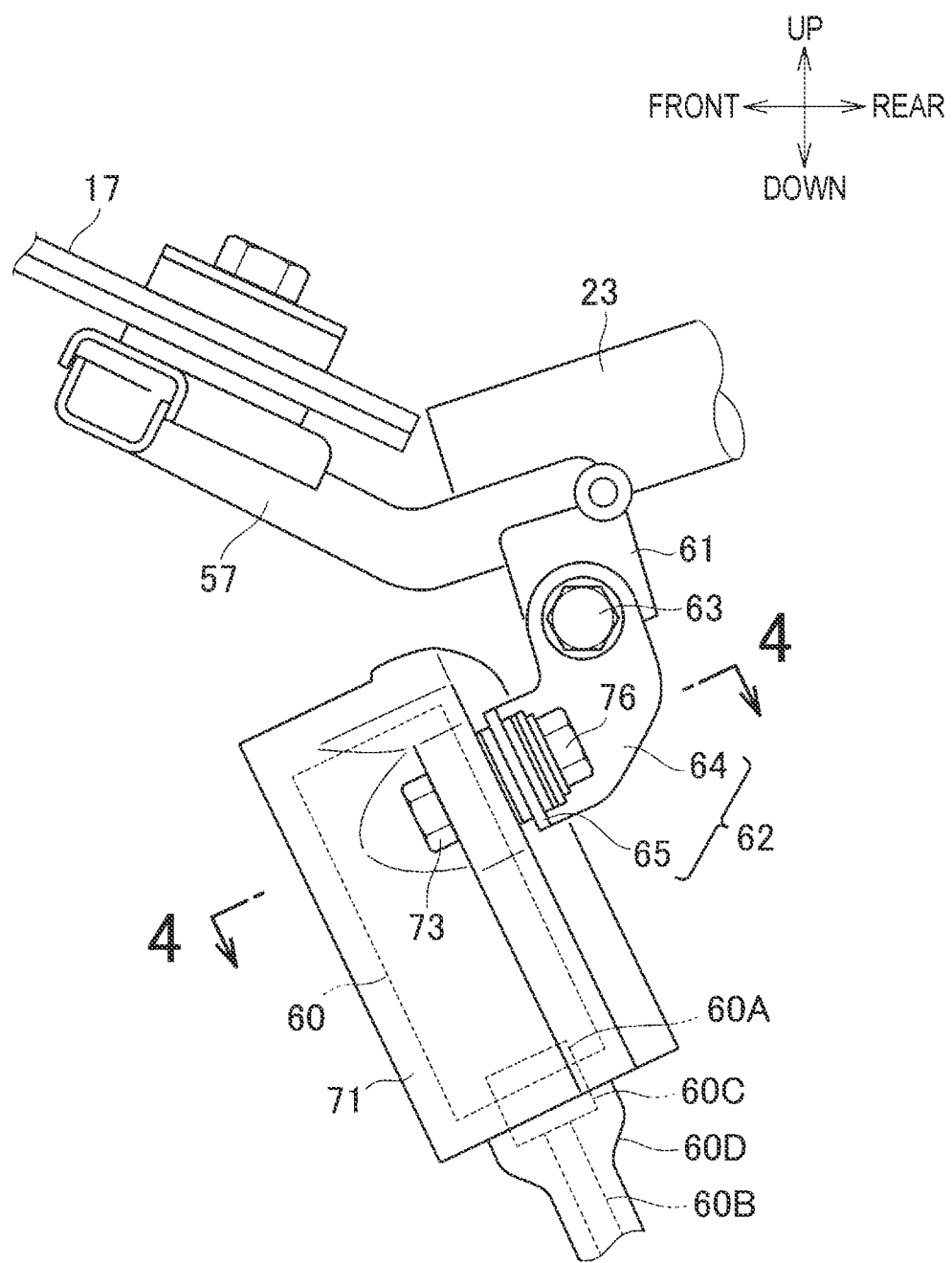
FIG. 3 is an enlarged view of a portion 3 in FIG. 2.

As shown in FIG. 3, a metal piece (or metal plate) 61 extending downward is suspended from the tank stay 57 extending from the lower portion of the front end of the seat frame 23. A sensor bracket 62 is detachably fastened to the metal piece 61 by a bolt 63. Note that "bracket" in a claim is a concept including the metal piece 61 and the sensor bracket 62. In the embodiment, the sensor bracket 62 is supported by the seat frame 23 through the tank stay 57 and the metal piece 61. However, the sensor bracket 62 may directly be supported by the seat frame 23 or may indirectly be supported as in the embodiment.

A connecting port 60A of a coupler 60C is formed in the lower surface of the acceleration sensor 60. A wire 60B extends downward from the coupler 60C. The coupler 60C and the wire 60B are covered with a coupler cover 60D. When the connecting port 60A is provided on the lower surface side of the acceleration sensor 60, water hardly enters the case, and the effect is further provided by the coupler cover 60D. The support structure of the acceleration sensor 60 will be described in detail with reference to FIG. 4 that is a sectional view taken along a line 4-4 in FIG. 3.

Figure 4:
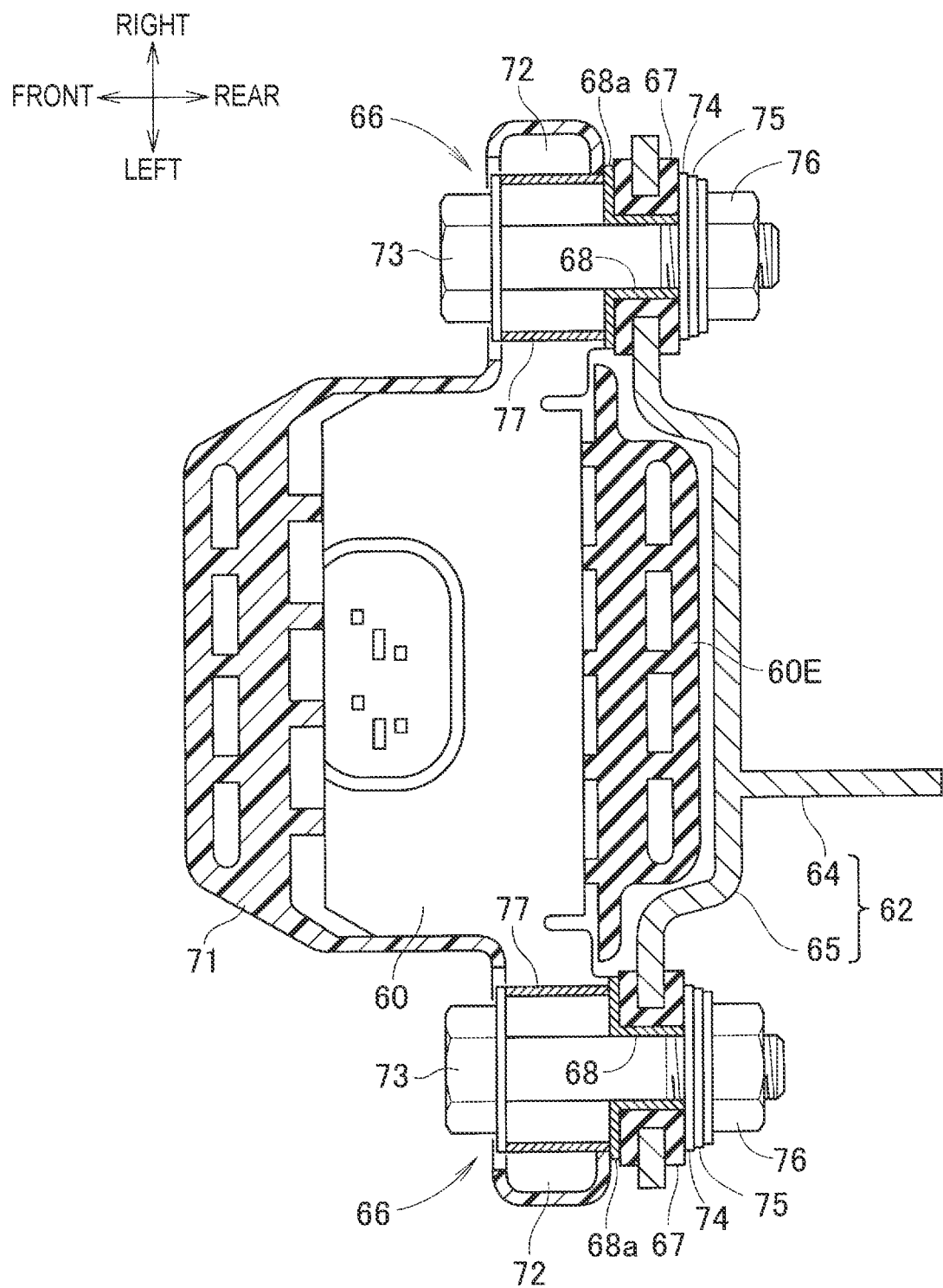
FIG. 4 is a sectional view taken along a line 4-4 in FIG. 3.

As shown in FIG. 4, the sensor bracket 62 includes an arm portion 64 extending in the vehicle longitudinal direction, and a cross portion 65 extending in the vehicle width direction from the distal end of the arm portion 64. Sensor support portions 66 are provided at the two ends of the cross portion 65. A tubular elastic member 67 made of rubber or a resin is fitted in the sensor support portion 66, and a flanged collar 68 is fitted in the tubular elastic member 67.

The acceleration sensor 60 is covered with a case 71 made of a resin. A flange portion 72 belonging to the acceleration sensor 60 is applied to the side of a flange 68*a* of the flanged collar 68, and a bolt 73 is inserted. The bolt 73 extends through the flanged collar 68, and the distal end of the bolt 73 projects from the flanged collar 68. Washers 74 and 75 are fitted on the projecting portion, and a nut 76 is threadably fastened. Note that a collar 77 may be fitted in the flange portion 72 to protect the flange portion 72 from bolt fastening. If the case 71 is made of a resin, the collar 77 may be formed integrally with the case 71 by insert molding. A rubber 60E is inserted on the rear side of the acceleration sensor 60 in the case 71.

As shown in FIG. 3, the acceleration sensor 60 is suspended from the seat frame 23 through the sensor bracket 62 (arm portion 64), the metal piece 61, and the tank stay 57. A vehicle body vibration is transmitted to the acceleration sensor 60 through the metal piece 61, the sensor bracket 62, and the tank stay 57. As shown in FIG. 4, the vibration is attenuated by the tubular elastic members 67. The vibration applied to the acceleration sensor 60 becomes much smaller.

Figure 5:
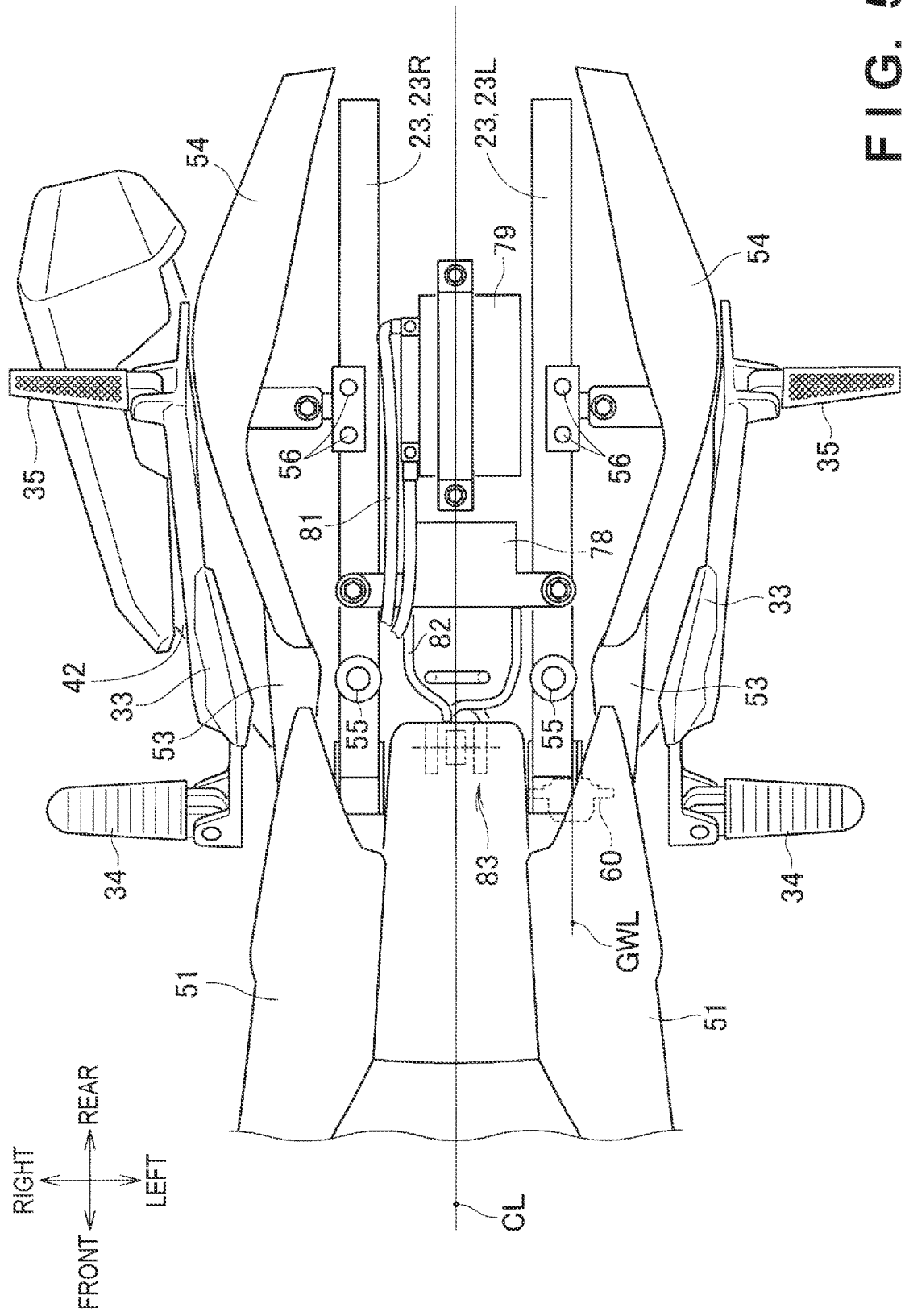
FIG. 5 is a plan view of the motorcycle in a state in which a seat is removed.

Referring to FIG. 5, CL is a center line in the vehicle width direction (vehicle center line), and GWL is a center line of the acceleration sensor 60 in the vehicle width direction. As shown in FIG. 5, under the seat (19 in FIG. 1), an ABS (Anti-lock Brake System) module 78 and a battery 79 are arranged in the vehicle longitudinal direction between the left and right seat frames 23L and 23R (L is a suffix representing left, R is a suffix representing right, and the same applies hereinafter). Between the left and right seat frames 23L and 23R, various harnesses 81 and 82 are also routed, and no sufficient space exists. In this embodiment, since the acceleration sensor 60 is arranged near the front end of the left seat frame 23, the arrangement of the acceleration sensor 60 has no influence on the layout of large electrical components such as the ABS module 78 and the battery 79.

An upper end support portion 83 of the rear cushion (28 in FIG. 1) exists between the left and right seat frames 23L and 23R in a plan view of the vehicle. The acceleration sensor 60 is arranged near the upper end support portion 83. In FIG. 1, the behavior of the rear wheel 26 is readily transmitted to the acceleration sensor 60 through the rear cushion 28. As a result, the behavior of the vehicle (motorcycle 10) is easily detected.

Furthermore, as shown in FIG. 1, the rear cushion 28 is tilted such that the upper portion is located on the front side of the vehicle with respect to the lower portion. Preferably, the rear cushion 28 is tilted so as to be almost parallel to a track 85 of the center of the rear wheel 26 drawn with respect to a supporting point 84 of the front wheel 13 as the center. In pitching, the rear wheel 26 displaces (including a load change) along the track 85. Hence, when the acceleration sensor 60 is tilted, the pitching can easily be detected.

Note that in the embodiment, the acceleration sensor 60 is arranged on the left side of the vehicle. However, it may be arranged on the right side. In this embodiment, the elastic member 67 that elastically supports the acceleration sensor 60 has a tubular shape. However, it may have a stacked structure or a clamp structure, and an arbitrary form can be employed. The elastic member 67 may be a spring.

The invention claimed is:
1. A motorcycle (10) comprising:
a main frame (21) extending backward from a head pipe (11);
a seat frame (23) connected to a rear portion of the main frame (21) and extending backward to support a seat (19);
an auxiliary frame (29) provided under the main frame (21) and having a rear end connected to the seat frame (23) to reinforce the seat frame (23); and
an acceleration sensor (60) configured to detect an acceleration, wherein the acceleration sensor (60) is supported at a position under the seat frame (23) and above the auxiliary frame (29) in a side view by a bracket (61, 62) extending from the seat frame (23) or the auxiliary frame (29), and
side surfaces of the acceleration sensor (60) are covered with a vehicle body cover (50);
the bracket includes:
an arm portion (64) extending in a vehicle longitudinal direction;
a cross portion (65) extending in a vehicle width direction and connected to an end of the arm portion (64); and
support portions (66) at two ends of the cross portion (65) in which tubular elastic members (67) are fitted;
the acceleration sensor (60) is fixed to the bracket by bolts (73) through the tubular elastic members (67) and nuts (76) fastened to the bolts (73).
2. The motorcycle according to claim 1, wherein the acceleration sensor (60) is arranged in a tilting state.
3. A motorcycle (10) comprising:
a main frame (21) extending backward from a head pipe (11);
a seat frame (23) connected to a rear portion of the main frame (21) and extending backward to support a seat (19);
an auxiliary frame (29) provided under the main frame (21) and having a rear end connected to the seat frame (23) to reinforce the seat frame (23);
a swing arm (25) to which a rear wheel (26) is rotatably attached,
a rear cushion (28) configured to be bridged over the swing arm (25) and the rear portion of the main frame (21), and
an acceleration sensor (60) configured to detect an acceleration, wherein the acceleration sensor (60) is supported at a position under the seat frame (23) and above the auxiliary frame (29) in a side view by a bracket (61, 62) extending from the seat frame (23) or the auxiliary frame (29),
side surfaces of the acceleration sensor (60) are covered with a vehicle body cover (50), and
in a plan view of the motorcycle, the bracket and an upper end support portion (83) of the rear cushion (28) are positioned on a line of a vehicle width direction.
4. A motorcycle (10) comprising:
a main frame (21) extending backward from a head pipe (11);
a seat frame (23) connected to a rear portion of the main frame (21) and extending backward to support a seat (19);
an auxiliary frame (29) provided under the main frame (21) and having a rear end connected to the seat frame (23) to reinforce the seat frame (23); and
an acceleration sensor (60) configured to detect an acceleration, wherein the acceleration sensor (60) is supported at a position under the seat frame (23) and above the auxiliary frame (29) in a side view by a bracket (61, 62) extending from the seat frame (23) or the auxiliary frame (29),
side surfaces of the acceleration sensor (60) are covered with a vehicle body cover (50), and the acceleration sensor (60) is arranged at a position where the acceleration sensor (60) at least partially overlaps the seat frame (23) or the auxiliary frame (29) in a plan view.

5. A motorcycle (10) comprising:
a main frame (21) extending backward from a head pipe (11);
a seat frame (23) connected to a rear portion of the main frame (21) and extending backward to support a seat (19);
an auxiliary frame (29) provided under the main frame (21) and having a rear end connected to the seat frame (23) to reinforce the seat frame (23); and
an acceleration sensor (60) configured to detect an acceleration, wherein the acceleration sensor (60) is supported at a position under the seat frame (23) and above the auxiliary frame (29) in a side view by a bracket (61, 62) extending from the seat frame (23) or the auxiliary frame (29),
side surfaces of the acceleration sensor (60) are covered with a vehicle body cover (50), and
the acceleration sensor (60) is stored in a case (71) made of a resin, and is provided with a connecting port (60A) of a coupler (60C) on a lower surface side.

* * * * *